Patented Jan. 30, 1940

2,188,489

UNITED STATES PATENT OFFICE 2,188,489

CHOCOLATE COATING AND PROCESS OF MAKING SAME

Collins Veatch, La Grange, Ill., assignor, by mesne assignments, to Corn Products Refining Company, New York, N. Y., a corporation of New Jersey No Drawing. Application July 17, 1937, Serial No. 154,201

10 Claims. (Cl. 99—23)

This invention relates to chocolate compounds consisting principally of chocolate and sugar, together with other ingredients, depending upon the particular use to which the coating is to be put, such compounds being used for coating candy centers, in the manufacture of chocolate creams for example, or for coating other candies or for cake icings or other similar coatings.

A primary object of the invention is to provide an inexpensive chocolate coating compound that will keep its color, as against the tendency to develop "sugar bloom" and that will remain relatively firm, without becoming excessively hard or brittle, during warm and moist weather.

It has been proposed to substitute an edible, relatively high melting fat, such as cocoanut butter, for part of the fat contained naturally in chocolate, for the purpose of reducing cost and diminishing the tendency of the compound to soften in warm weather. This substitution, however, due to the fact that the cocoanut fat does not melt at body temperatures, gives the coating an unpleasant waxy taste. This tendency is overcome, in accordance with the present invention, by using a relatively large quantity of dextrose as the sugar element of the compound, in place of the usual sucrose which is ordinarily used in smaller amounts. It is possible to use the large quantity of dextrose because of its low degree of sweetness in comparison with sucrose. However, if dextrose alone does not make the coating sweet enough some sucrose may be used in addition to the dextrose.

To prevent sugar bloom, that is the development of a grayish color due to the segregation and crystallization of the sugar, which appears to have a tendency to come to the surface of the coating, the present invention provides for the use of substances which when present act to retard the segregation and crystallization of the dextrose in this manner. The most effective substances for the prevention or retardation of bloom are gelatin and gelatinized thin boiling starch. The latter is produced by first treating the starch in the usual manner for making it thin boiling and then passing the same, in a moist condition, over heated surfaces to bring about gelatinization. This double treatment of the starch increases the readiness with which it forms a colloidal solution in water. Apparently the starch particles consist of extremely small flakes which are very readily dispersed and with uniformity throughout the chocolate syrup.

It is desirable to use in the compound a certain amount of non-crystallizable syrup such as corn syrup, or other starch syrup. This substance gives softness to the coating and acts to some extent to retard the segregation and crystallization of the dextrose.

The compound is prepared in a liquid or semi-liquid form and may be used at once for coating purposes; or it may be allowed to set and afterwards be melted up when required for use.

One of the advantages of the invention is that the chocolate sugar compound does not have to be milled as is customary in making chocolate coatings. The milling of chocolate compounds is expensive and time consuming.

It is preferable for reasons of economy and also in order to give the desired firmness and stability to the coating in hot and moist weather to replace part of the chocolate fat with a higher boiling point fat. This feature, however, is not essential. It is possible to have some at least of the advantages of the invention if a chocolate with the ordinary fat content of about 52% is used.

The setting of this coating is due primarily to the crystallization of the dextrose, as dextrose hydrate, and not entirely or mainly to the setting of the fat as is the case with ordinary milled chocolate coatings. Hence, the coating is less susceptible to temperature changes.

The following is a specific example of the application of the invention to practice. The data given are, however, purely illustrative and informative and the invention is not limited to these particulars; the intention being to cover all equivalents and all modifications within the scope of the appended claims.

*Example.*—The preferred ingredients in their proportions by weight are as follows:

| | Parts by weight |
|---|---|
| Cocoa powder (18% fat) | 50 |
| Cocoanut butter | 25 |
| Anhydrous dextrose (or hydrate dextrose) | 260 |
| Corn syrup (43° Baumé) | 25 |
| Gelatin | 5 |
| Gelatinized thin boiling corn starch | 5 |

To the above may be added small quantities of salt and vanilla extract or other flavoring.

The dextrose, corn syrup and salt are cooked with 90 parts of water at a temperature of 230° F. which dissolves the sugar and gives a proper density to the syrup.

To this syrup is added the cocoa powder and cocoanut butter which are thoroughly mixed in.

The temperature is reduced to 160° F. at which time the gelatin and gelatinized starch are added dissolved in 35 parts of water.

The mix is allowed to cool to about 110° F. and the vanilla extract is then added with about 4 parts of powdered dextrose for seeding purposes.

The mixture thus formed may be used at once for dipping or coating purposes. It will be found more convenient, however, ordinarily, to allow the material to set and to remelt it when required for use. To prepare the solidified compound for use it is broken up into small pieces and heated to a temperature of 140°–150° F. in a vessel placed in a hot water bath. If the compound is used for coating chocolate cream centers by the dipping method, it will be allowed to cool before use to a temperature of about 92° F. or lower. The consistency of the compound at the proper dipping temperature must be such, naturally, that it will be soft enough to cover the center easily, yet firm enough so that it does not run or form feet on the coated centers.

The thin boiling gelatinized starch, used in the above formula, is preferably produced according to the following process:

Raw corn starch is heated with water in the presence of an acid by the ordinary method of making thin boiling starch to produce a thin boiling starch of 20 fluidity (method of Hambden Buel Original Communications, Eighth International Congress of Applied Chemistry, Vol. XIII, page 63.) The starch liquor neutralized to a pH of 6.5 to 6.8 is de-watered to a density of about 22° to 24° Baumé and is fed to a spreader roll and by it transferred to a hollow drying roll in contact with the spreader roll and internally heated by steam at 165 pounds per square inch. The material is scraped from the drying roll and ground. The fluidity of the starch might be varied between 10 and 60, or might be even higher than 60. Practical densities are between 20° and 25° Baumé, although operation outside of this range is possible.

By "cocoa" is meant a chocolate in which the butter fat is considerably reduced say to 18% more or less.

I claim:

1. A chocolate coating compound comprising in intimate mixture fat-containing chocolate, dextrose, gelatin and gelatinized thin boiling starch.

2. A chocolate coating compound comprising in intimate mixture chocolate, the fat content of which has been reduced, a fat having a boiling point higher than chocolate butter-fat, dextrose, gelatin, and gelatinized thin boiling starch.

3. A chocolate coating compound comprising in intimate mixture chocolate, the fat content of which has been reduced to substantially 18%, cocoanut butter, dextrose, gelatin and gelatinized thin boiling starch.

4. A chocolate coating compound comprising in intimate mixture and in substantially the stated proportions by weight: cocoa 50 parts; cocoanut butter 25 parts; dextrose 260 parts; corn syrup 25 parts; gelatin 5 parts; gelatinized thin boiling starch 5 parts; and water 125 parts.

5. Method of preparing a non-milled chocolate coating which comprises heating dextrose and corn syrup to dissolve the dextrose; mixing into the resultant hot syrup a fat-containing chocolate; reducing the temperature of the mixture and adding thereto gelatin and gelatinized thin boiling starch.

6. Method of preparing a non-milled chocolate coating which comprises heating dextrose and corn syrup to dissolve the dextrose; mixing into the resultant hot syrup chocolate having a fat content of substantially 50%; reducing the temperature of the mixture and adding thereto gelatin and gelatinized starch.

7. Method of preparing a non-milled chocolate coating which comprises heating dextrose and corn syrup to dissolve the dextrose; mixing into the resulting hot syrup a mixture of chocolate, the fat content of which has been reduced to substantially 18%, and a higher melting point fat, reducing the temperature of the mixture and adding thereto gelatin and gelatinized starch.

8. Method of preparing a non-milled chocolate coating compound which comprises heating a mixture of dextrose and corn syrup to a temperature of substantially 230° F. to dissolve the sugar; mixing into the resulting hot syrup cocoa powder and cocoanut butter; reducing the temperature of the mixture to substantially 160° F.; and adding thereto a solution of gelatin and gelatinized thin boiling starch.

9. Process of preparing a non-milled chocolate coating compound which comprises heating dextrose and corn syrup to a temperature to dissolve the sugar, mixing into the resulting hot syrup a mixture of cocoa powder and cocoanut butter; reducing the temperature of the mixture; and adding thereto a solution of gelatin and gelatinized thin boiling starch.

10. Method of preparing a non-milled chocolate coating which comprises cooking a water mixture of dextrose, corn syrup and salt at a temperature of substantially 230° F.; mixing with the syrup thus produced cocoa powder (18% fat) and cocoanut butter; reducing the temperature of the mixture to substantially 160° F. and adding thereto a solution of gelatin and gelatinized starch; further cooling the mixture to substantially 110° F. and adding flavoring material and powdered dextrose for seeding purposes, the dextrose content of the coating being in excess of 50% by weight of all the ingredients.

COLLINS VEATCH.